May 16, 1967 H. ZIMMERMANN 3,319,967
ANTI-SKI SKATING DEVICE
Filed Jan. 14, 1966

INVENTOR
Heinrich Zimmermann
By Ernest G. Montague
Attorney

United States Patent Office 3,319,967
Patented May 16, 1967

3,319,967

ANTI-SKI SKATING DEVICE

Heinrich Zimmermann, St. Georgen, Black Forest, Germany, assignor to Dual Gebruder Steidinger, St. Georgen, Germany, a corporation of Germany Filed Jan. 14, 1966, Ser. No. 520,686
Claims priority, application Germany, Jan. 16, 1965, St 23,214
4 Claims (Cl. 274—23)

The present invention relates to a so-called anti-skating device, i.e., a device on a pickup, which is disposed pivotally about a vertical axis for scanning a record and on the axis of which a weight-loaded thread exerts a rotary moment, which counteracts the pivot movement during the scanning procedure.

Devices of this type serve the purpose of compensating the rotary moment, which is created due to the finite length of the pickup and the friction force between the scanning needle and the record in its vertical pivot axis, in order to equalize the engaging pressure of the needle on both flanks of the scanning groove. Such devices are designed adjustably, which expedient is particularly required if the bearing weight of the pickup arm is variable. Due to the finite length of the pickup arm, the rotary moment is, however, not constant over the entire scanning range of the pickup arm.

In a known device the rotary moment is produced by means of a weight-loaded thread which is turned round in an eyelet and which engages the pickup arm. A variation is brought about by displacement of the engaging point of the thread on the pickup arm. By this device neither a rotary moment which is constant, nor which is accommodated to the measurements of the pickup arm is obtainable. Also, the value of the rotary moment varies over the swinging range of the pickup arm with the displacement of the engaging point of the thread. Finally, such device is also cumbersome relative to the general operation of the device.

In another known device a weight-loaded lever mounted on the base plate of the device is arranged such that it stands in engagement with a pin secured in radial direction to the vertical pivot axis of the pickup arm. Here again, neither an exactly constant moment, nor a rotary moment adjusted exactly to the measurements of the pickup arm is possible. Furthermore, such device causes also an appreciable friction.

It is, therefore, one object of the present invention to provide an anti-skating device, wherein in each pivot position of the pickup arm the correct compensation force is produced.

It is another object of the present invention to provide an anti-skating device, wherein the apparatus is robust in its operation and nevertheless very poor in friction.

With these and other objects in view which will become apparent in the following detailed description, the present invention will be clearly understood in connection with the accompanying drawing, in which.

Figure 1:
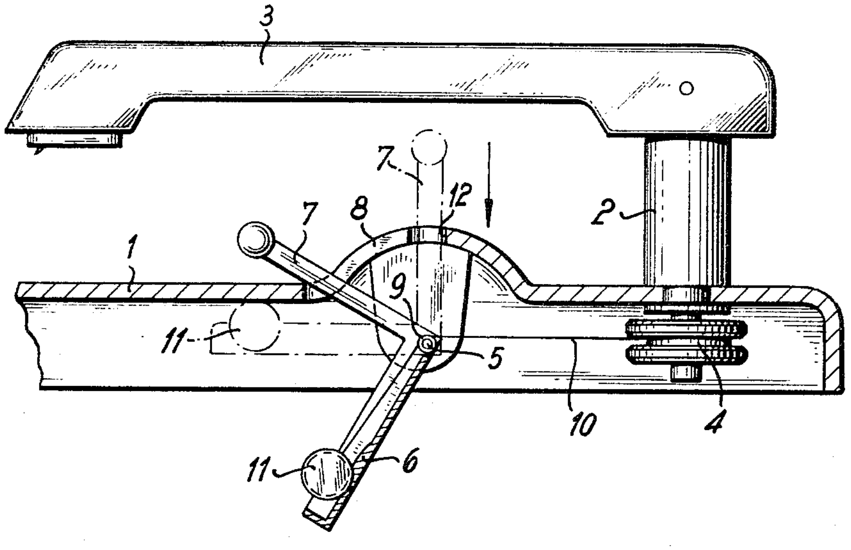
FIGURE 1 is a fragmentary elevation, partly in section, of a record player in combination with a pickup arm.
Figure 2:
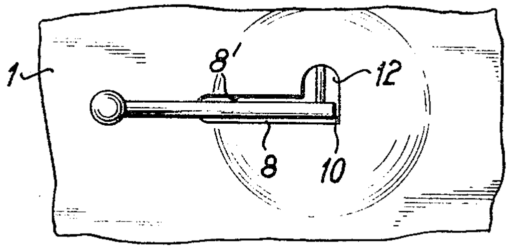
FIG. 2 is a fragmentary top plan view of the record player seen in the direction A.

Referring now to the drawing, the anti-skating device comprises a base plate 1 on which a pickup arm 3 is pivotally mounted about a vertical axis 2. A roller 4 is secured to the axis 2. A U-shaped slide path 6 is swingably mounted to pivot about a horizontal axis 5 on the base plate 1. On the bearing side end of the slide path 6 is disposed an elastic lever 7, which projects through a slot 8 provided in the base plate 1 and which is tensioned such that it engages the flank 8' of the slot 8. A roller 9 sits on the axis 5 of the slide path 6, over which roller 9 runs a thread 10, which at one end is connected with a weight 11 and on the other end with the roller 4.

By displacement of the lever 7 in the slot 8, the pulling tension, which is exerted by the weight 11 upon the thread 10 can be varied. Since the lever 7 has a lateral pre-tension, it rests upon its displacement to the end position in a recess 12, shown in point-dotted lines in FIG. 1. In this position the weight 11 is pushed towards the bottom face of the base plate 1 and is, thereby, in a position secured against transportation jolts.

The slide path 6 of the weight 11 differs slightly from a straight line, so that the weight 11 during rolling down to the end of the slide path 6 produces at each point of the slide path 6 the desired compensation moment.

Figure 3:
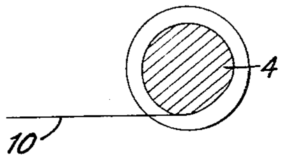
FIG. 3 is a section of the roller constituting a second embodiment with a thread.

Another exact adaptation is obtainable such, that the periphery of the roller 4 is designed as to its configuration, such that the effective lever arm of the thread 10 wound-up thereon is so large at each rotary angle, that the desired compensation moment is produced. As indicated in FIG. 3 of the drawing, the roller 4 has a non-circular periphery of varying radii at least on the engagement face with the thread 10. The varying radii are chosen such that the imaginary lever arm affecting the pivot axis of the pickup arm of the unwinding thread during the pivot movement of the pickup arm produces by means of the weight a compensation moment corresponding with the prevailing pivot of the pickup arm.

While I have disclosed several embodiments of the present invention, it is to be understood that these embodiments are given by example only and not in a limiting sense, the scope of the present invention being determined by the objects and the claims.

I claim:

1. In a record player including a turntable and a pickup arm carrying a pickup at one end,
- a base plate,
- said pickup arm being pivotally mounted at the other end about an axis disposed parallel to the pivot axis of said turntable,
- a roller rotatably mounted on said pivot axis of said pickup arm and rotating jointly with the latter,
- a slide path inclined downwardly and adjustably secured to said base plate to assume any one of a plurality of inclined positions,
- a manually operable lever secured to one end of said slide path and projecting through said base plate for operation of said lever above said base plate,
- a weight guided along said slide path, and
- a thread one end of the latter being secured to said weight and the other end of said thread being connected with and wound about said roller, whereby said weight will move along said slide path upon pivoting said pickup arm.

2. The record player, as set forth in claim 1, wherein
- said roller has a non-circular periphery of varying radii at least on the engagement face with said thread, and
- said varying radii being chosen such that the imaginary lever arm affecting the pivot axis of said pickup arm of said unwinding thread during the pivot movement of said pickup arm produces by means of said weight a compensation moment corresponding with the prevailing pivoted position of said pickup arm.

3. The record player, as set forth in claim 1, wherein
- said slide path has a curve-shaped operating face for said weight such that said weight sliding on said slide path produces a compensation moment corresponding with the prevailing pivot position of said pickup arm.

4. The record player, as set forth in claim 1, wherein said base plate has a recess within the path of movement of said manually operable lever and said recess receiving and operating as locking means for said lever in one of its end positions, and
said weight abutting in said one of said end positions of said lever the bottom face of said base plate, so that said weight is secured in an immovable position during transportation of said record player.

No references cited.

LEONARD FORMAN, *Primary Examiner.*

H. N. HAROIAN, *Assistant Examiner.*